US011114243B2

(12) United States Patent
Sugita (10) Patent No.: US 11,114,243 B2
(45) Date of Patent: Sep. 7, 2021

(54) MULTILAYER CERAMIC CAPACITOR AND METHOD FOR PRODUCING THE SAME

(71) Applicant: Murata Manufacturing Co., Ltd., Nagaokakyo (JP)

(72) Inventor: Hiroaki Sugita, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 116 days.

(21) Appl. No.: 16/383,716

(22) Filed: Apr. 15, 2019

(65) Prior Publication Data

US 2019/0333698 A1 Oct. 31, 2019

(30) Foreign Application Priority Data

Apr. 27, 2018 (JP) .............................. JP2018-086805

(51) Int. Cl.
| | | |
|---|---|---|
| *H01G 4/12* | (2006.01) | |
| *H01G 4/30* | (2006.01) | |
| *H01G 4/012* | (2006.01) | |
| *H01G 4/008* | (2006.01) | |
| *H01G 4/248* | (2006.01) | |
| *H01G 4/232* | (2006.01) | |

(52) U.S. Cl.
CPC ......... *H01G 4/1236* (2013.01); *H01G 4/0085* (2013.01); *H01G 4/012* (2013.01); *H01G 4/1227* (2013.01); *H01G 4/2325* (2013.01); *H01G 4/248* (2013.01); *H01G 4/30* (2013.01)

(58) Field of Classification Search
CPC ........ H01G 4/30; H01G 4/012; H01G 4/1236; H01G 4/0085; H01G 4/248; H01G 4/1227; H01G 4/2325; H02G 4/1236; H02G 4/252

USPC ......... 361/301.4, 321.1, 321.2, 321.3, 306.3, 361/320, 303, 311
See application file for complete search history.

(56) References Cited

U.S. PATENT DOCUMENTS

| | | | | |
|---|---|---|---|---|
| 5,835,338 | A | * | 11/1998 | Suzuki ..................... H01G 4/30 361/301.4 |
| 8,988,850 | B1 | * | 3/2015 | Kodama .................. H01G 4/30 361/301.4 |
| 2002/0149901 | A1 | | 10/2002 | Shindo et al. |
| 2007/0074806 | A1 | * | 4/2007 | Kojima .................. C04B 35/638 156/89.16 |
| 2012/0218677 | A1 | * | 8/2012 | Fujisawa ............... C22C 1/0433 361/301.4 |
| 2014/0177133 | A1 | | 6/2014 | Lee et al. |

(Continued)

FOREIGN PATENT DOCUMENTS

| | | |
|---|---|---|
| JP | 64-26169 A | 1/1989 |
| JP | 2002-260951 A | 9/2002 |
| JP | 2010-215478 A | 9/2010 |

(Continued)

*Primary Examiner* — Arun Ramaswamy
(74) *Attorney, Agent, or Firm* — Keating & Bennett, LLP (57) ABSTRACT

A multilayer ceramic capacitor has a cuboid or substantially cuboid multilayer body including a stack of dielectric layers, inner-electrode layers alternating with the dielectric layers and exposed at end surfaces of the multilayer body, and outer electrodes on the end surfaces and coupled to the inner-electrode layers. The dielectric layers are primarily made of barium titanate. At the interfaces between the dielectric and inner-electrode layers, protective layers containing calcium zirconate cover the inner-electrode layers.

18 Claims, 4 Drawing Sheets

(56) References Cited

U.S. PATENT DOCUMENTS

2014/0226254 A1  8/2014 Kim et al.
2016/0293331 A1* 10/2016 Kitamura ................ H01G 4/12

FOREIGN PATENT DOCUMENTS

| JP | 2014-123698 A | 7/2014 |
| JP | 2014-154543 A | 8/2014 |

* cited by examiner

MULTILAYER CERAMIC CAPACITOR AND METHOD FOR PRODUCING THE SAME

CROSS REFERENCE TO RELATED APPLICATIONS

This application claims the benefit of priority to Japanese Patent Application No. 2018-086805 filed on Apr. 27, 2018. The entire contents of this application are hereby incorporated herein by reference.

BACKGROUND OF THE INVENTION

1. Field of the Invention

The present invention relates to a multilayer ceramic capacitor and a method for producing the multilayer ceramic capacitor.

2. Description of the Related Art

Recent advances in electronic technologies have led to a need for multilayer ceramic capacitors (MLCCs) smaller in size and having a higher capacitance. The high capacitance requirement has been commonly addressed by the use of barium titanate as a primary dielectric material because its high dielectric constant helps increase the capacitance (e.g., see Japanese Examined Patent Application Publication No. 1-26169).

With its inherent nature, barium titanate may admittedly give an MLCC made primarily of it a high dielectric constant and a high capacitance, but firing in a reducing atmosphere produces oxygen vacancies, the migration of which affect the MLCC's reliability in operation at high temperatures.

Temperature-compensating MLCCs are also known, and they are made primarily of calcium zirconate (e.g., see Japanese Unexamined Patent Application Publication No. 2010-215478).

Calcium zirconate-based MLCCs are superior in reliability when operated at high temperatures owing to the inherently high electrical resistance of calcium zirconate particles, but their capacitance is not as high as that of barium titanate-based MLCCs because of the lower dielectric constant of calcium zirconate.

SUMMARY OF THE INVENTION

Preferred embodiments of the present invention are able to provide multilayer ceramic capacitors that combine reliability in operation at high temperatures and a high capacitance. Preferred embodiments of the present invention also provide methods for producing such multilayer ceramic capacitors.

According to a preferred embodiment of the present invention, a multilayer ceramic capacitor includes a multilayer body, a plurality of inner-electrode layers, and outer electrodes. The multilayer body includes a stack of a plurality of dielectric layers and includes first and second primary surfaces opposite each other in a stacking direction, first and second lateral surfaces opposite each other in a width direction that is perpendicular to the stacking direction, and first and second end surfaces opposite each other in the length direction that is perpendicular to both the stacking direction and width direction. The inner-electrode layers alternate with the dielectric layers and are exposed at the end surfaces. The outer electrodes are on the end surfaces and coupled to the inner-electrode layers. The dielectric layers are primarily made of barium titanate. At the interfaces between the dielectric layers and the inner-electrode layers, protective layers containing calcium zirconate cover the inner-electrode layers.

According to a preferred embodiment of the present invention, a method for producing a multilayer ceramic capacitor including a multilayer body, a plurality of inner-electrode layers, and outer electrodes. The multilayer body includes a stack of a plurality of dielectric layers and includes first and second primary surfaces opposite each other in a stacking direction, first and second lateral surfaces opposite each other in a width direction that is perpendicular to the stacking direction, and first and second end surfaces opposite each other in a length direction that is perpendicular to both the stacking direction and width direction. The inner-electrode layers alternate with the dielectric layers and are exposed at the end surfaces. The outer electrodes are on the end surfaces and coupled to the inner-electrode layers. The method includes preparing dielectric sheets containing barium titanate as a primary ingredient; preparing an electrically conductive paste to form inner electrodes; forming an inner-electrode pattern on a plurality of the dielectric sheets by applying the electrically conductive paste; obtaining a multilayer sheet by stacking a predetermined number of dielectric sheets not printed with the inner-electrode pattern to form a first outer-layer section, stacking the dielectric sheets printed with the inner-electrode pattern on the first outer-layer section to form an inner-layer section, and stacking a predetermined number of dielectric sheets not printed with the inner-electrode pattern on the inner-layer section to form a second outer-layer section; obtaining a multilayer block by pressing the multilayer sheet in the stacking direction; obtaining multilayer chips by cutting the multilayer block to a predetermined size; and obtaining multilayer bodies by firing the multilayer chips. In the preparing an electrically conductive paste, a powder of calcium zirconate is added to the electrically conductive paste. In the obtaining multilayer bodies by firing the multilayer chips, the multilayer chips are fired at a firing temperature of about 1200° C. or more and about 1400° C. or less; in a firing atmosphere containing about 1000 ppm or more and about 5000 ppm or less of oxygen concentration; with the rate of temperature rise from about 800° C. to the highest temperature being at least about 100° C./sec; and for a firing duration of about 4 seconds or more and about 8 seconds or less.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiments of an MLCC

Figure 1:
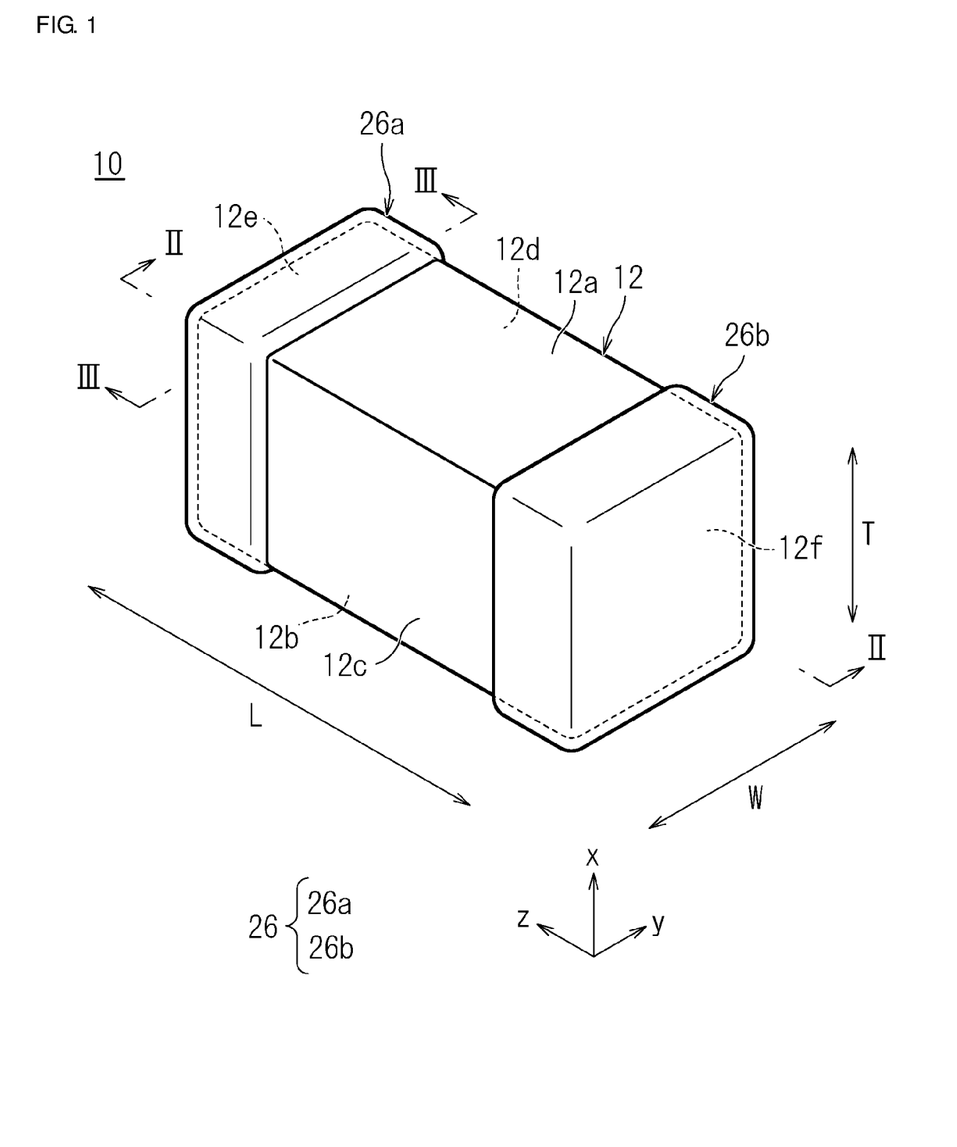
FIG. 1 is an outside perspective view of an example of a multilayer ceramic capacitor (MLCC) produced by a method according to a preferred embodiment of the present invention.
Figure 2:
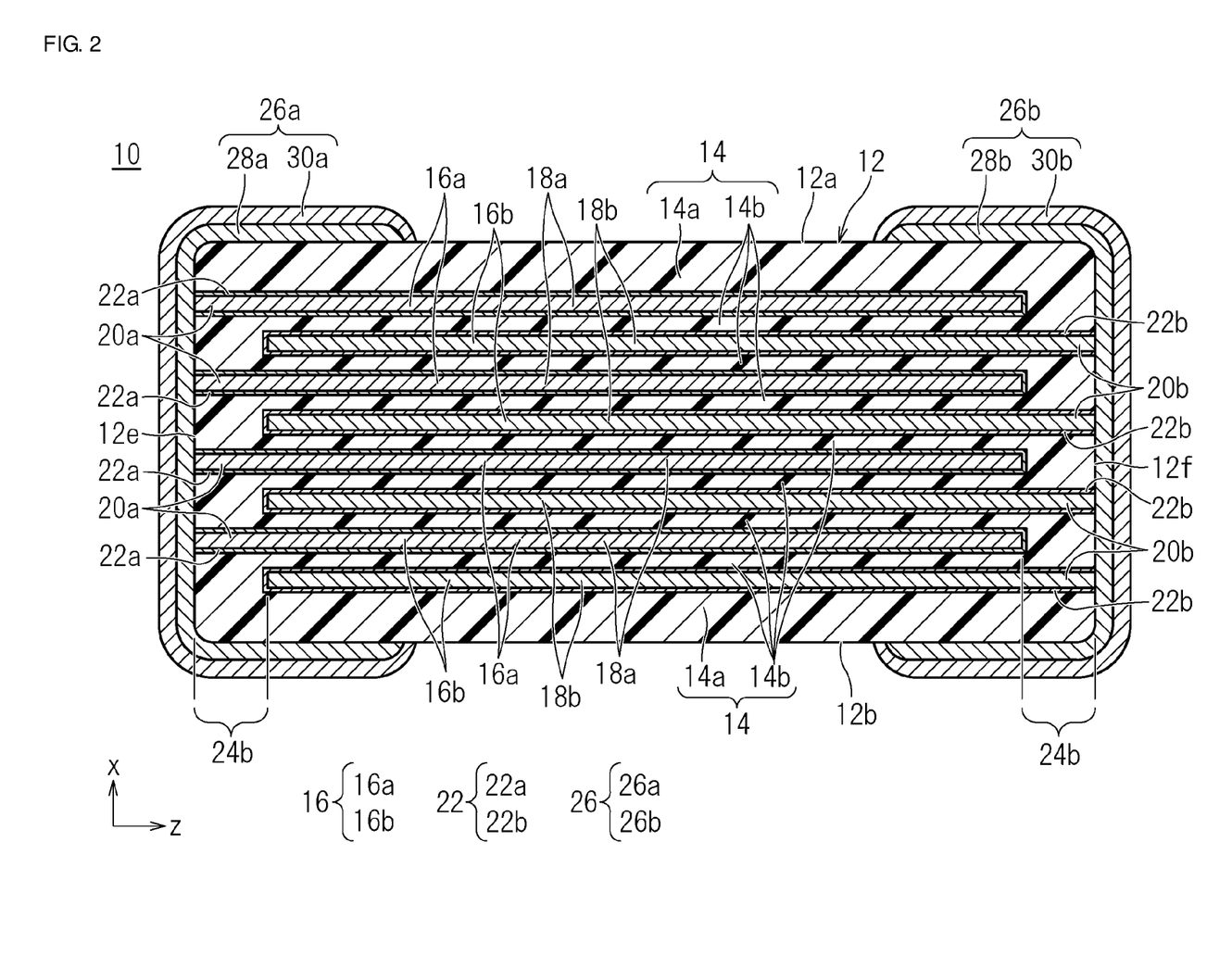
FIG. 2 is a cross-section taken along line II-II of FIG. 1 and illustrates an MLCC produced by a method according to a preferred embodiment of the present invention.
Figure 3:
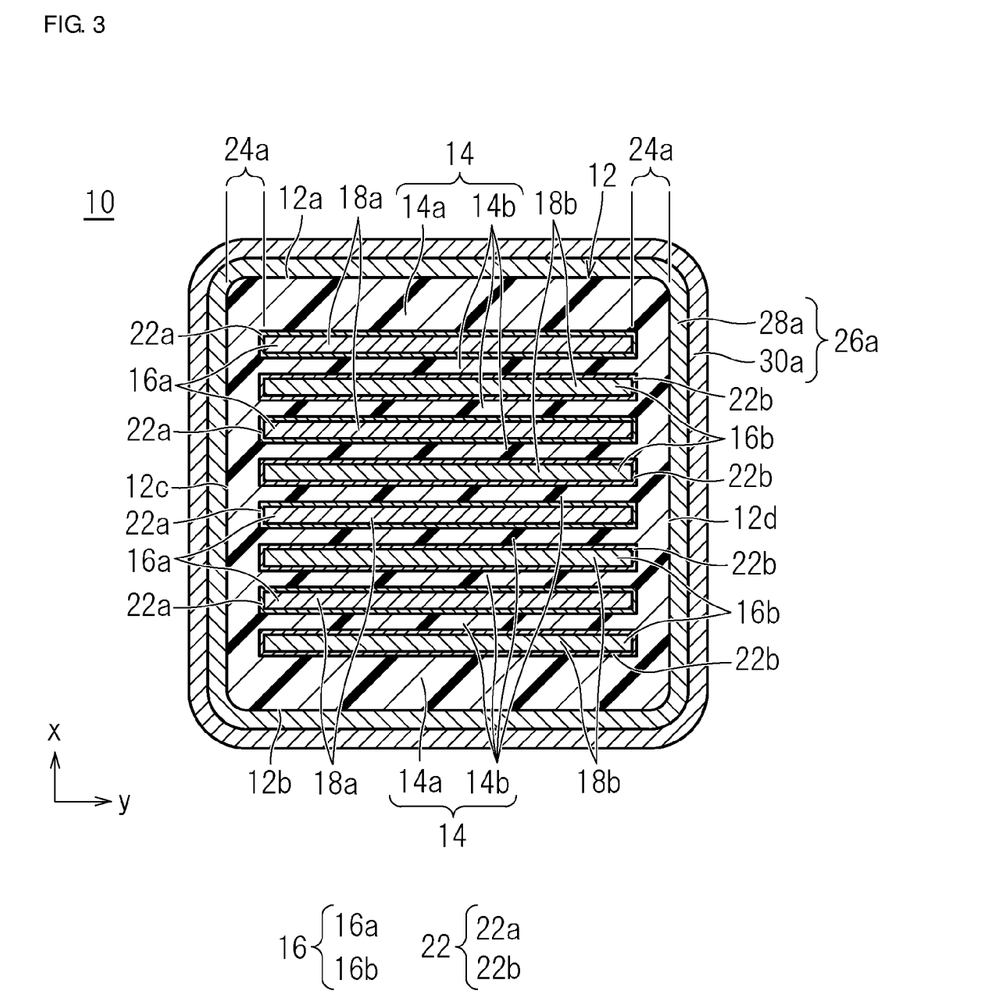
FIG. 3 is a cross-section taken along line of FIG. 1 and illustrates an MLCC produced by a method according to a preferred embodiment of the present invention.

The following describes multilayer ceramic capacitors (MLCC) according to preferred embodiments of the present invention. FIG. 1 is an outside perspective view of an example of an MLCC produced by a method according to a preferred embodiment of the present invention. FIG. 2 is a cross-section taken along line II-II of FIG. 1 and illustrates an MLCC produced by a method according to a preferred embodiment of the present invention. FIG. 3 is a cross-section taken along line of FIG. 1 and illustrates an MLCC produced by a method according to a preferred embodiment of the present invention.

As illustrated in FIGS. 1 to 3, the MLCC 10 includes a substantially cuboid multilayer body 12.

The multilayer body 12 includes a stack of multiple dielectric layers 14 and multiple inner-electrode layers 16 and includes first and second primary surfaces 12a, 12b opposite each other in a stacking direction x, first and second lateral surfaces 12c, 12d opposite each other in a width direction y that is perpendicular to the stacking direction x, and first and second end surfaces 12e, 12f opposite each other in a length direction z that is perpendicular to both the stacking direction x and width direction y. The corners and edges of the multilayer body 12 are preferably rounded. Here, the corners of a multilayer body 12 represent the points at which its three adjacent surfaces meet, and the edges the portions at which its two adjacent surfaces meet. The first and second primary surfaces 12a, 12b, first and second lateral surfaces 12c, 12d, and first and second end surfaces 12e, 12f may be textured, for example, partially or throughout. The multilayer body 12 does not need to be longer in the length direction z than in the width direction y.

The number of dielectric layers 14 stacked is not critical. Preferably, about 11 to about 1400 dielectric layers 14 are stacked including those in the outer-layer sections 14a.

The multilayer body 12 includes two outer-layer sections 14a each defined by multiple dielectric layers 14, and an inner-layer section 14b defined by one or more dielectric layers 14 and multiple inner-electrode layers 16 on the dielectric layer(s) 14. The outer-layer sections 14a are on the first and second primary surfaces 12a, 12b sides of the multilayer body 12. One includes multiple dielectric layers 14 between the first primary surface 12a and the proximate inner-electrode layer 16, and the other of multiple dielectric layers 14 between the second primary surface 12b and the proximate inner-electrode layer 16. Between the two outer-layer sections 14a is the inner-layer section 14b. Preferably, the thickness of the outer-layer sections 14a is about 20 μm or more and about 200 μm or less, for example.

The dimensions of the multilayer body 12 are preferably are about 0.185 mm or more and about 3.450 mm or less in the length direction z, about 0.090 mm or more and about 2.600 mm or less in the width direction y, and about 0.090 mm or more and about 2.600 mm or less in the stacking direction x, for example.

The dielectric layers 14 can be made of, for example, a dielectric material. The dielectric material can be a barium titanate ($BaTiO_3$)-based dielectric ceramic. If made primarily of such a dielectric material, the dielectric layers 14 may optionally contain smaller amounts of minor components, such as, for example, compounds of Mn, Fe, Cr, Co, and Ni, selected according to the desired characteristics of the multilayer body 12.

Preferably, the as-fired thickness of the dielectric layers 14 is about 0.70 μm or more and about 1.50 μm or less, for example.

The multiple inner-electrode layers 16 in the multilayer body 12 are multiple first and multiple second inner-electrode layers 16a, 16b, for example, in a rectangular or substantially rectangular shape. The first and second inner-electrode layers 16a, 16b alternate in the stacking direction x at regular or substantially regular intervals.

The first inner-electrode layers 16a include a first facing-electrode section 18a, where they face the second inner-electrode layers 16b, and a first extended-electrode section 20a, located at an end of the first inner-electrode layers 16a and extending from the first facing-electrode section 18a to the first end surface 12e of the multilayer body 12. The end of the first extended-electrode section 20a is exposed at the first end surface 12e.

The second inner-electrode layers 16b include a second facing-electrode section 18b, where they face the first inner-electrode layers 16a, and a second extended-electrode section 20b, located at an end of the second inner-electrode layers 16b and extending from the second facing-electrode section 18b to the second end surface 12f of the multilayer body 12. The end of the second extended-electrode section 20b is exposed at the second end surface 12f.

The first and second facing-electrode sections 18a, 18b, of the first and second inner-electrode layers 16a, 16b, respectively, may have any shape but preferably are rectangular or substantially rectangular. A substantially rectangular facing-electrode section may have rounded or chamfered corners (tapered end).

The first and second extended-electrode sections 20a, 20b, of the first and second inner-electrode layers 16a, 16b, respectively, may have any shape but preferably are rectangular or substantially rectangular. A rectangular or substantially rectangular extended-electrode section may have rounded or chamfered corners (tapered end).

The first facing-electrode section 18a and first extended-electrode section 20a, of the first inner-electrode layers 16a, may have an equal width, or one may be narrower than the other. Likewise, the second facing-electrode section 18b and second extended-electrode section 20b, of the second inner-electrode layers 16b, may have an equal width, or one may be narrower than the other.

At the interfaces between the dielectric layers 14 and the inner-electrode layers 16, protective layers 22 cover the inner-electrode layers 16. The protective layers 22 include first protective layers 22a and second protective layers 22b. The first protective layers 22a cover the first inner-electrode layers 16a, and the second protective layers 22b cover the second inner-electrode layers 16b.

The protective layers 22 preferably contain calcium zirconate ($CaZrO_3$).

The present preferred embodiment of the present invention is advantageous by virtue of the protective layers 22 being present at least at the interfaces between the dielectric layers 14 and the inner-electrode layers 16 except at the ends of the inner-electrode layers 16. Additionally covering the interfaces at the ends of the inner-electrode layers 16 is preferred; it enhances the advantages of this preferred embodiment of the present invention.

Preferably, the thickness of the protective layers 22 is about 1.5% or more and about 15% or less of that of the dielectric layers 14, for example. This makes it more certain that the MLCC 10 has improved reliability. The inventors of this invention have discovered that protective layers 22 which are thinner than about 1.5% of the dielectric layers 14 are uneven and result in lower reliability. The inventors of this invention have also discovered that protective layers 22 thicker than about 15% of the dielectric layers 14 result in a lower capacitance because of the low dielectric constant of the protective layers 22.

The presence of the protective layers 22 can be checked by grinding the multilayer body 12 to expose a cross-section (e.g., an LT cross-section at about ½ W), analyzing the ground cross-section by wavelength-dispersive X-ray spectroscopy (WDX), and identifying the distribution of the protective layers 22 on the basis of differences in chemical make-up. A transmission electron microscopic (TEM) analysis of a thin piece sampled from a cross-section (including the dielectric layers 14 and the inner-electrode layers 16) gives more detailed information on the differences in chemical make-up.

The multilayer body 12 includes its lateral portions (W gaps) 24a and end portions (L gaps) 24b. The lateral portions 24a are provided between an end of the first and second facing-electrode sections 18a, 18b in the width direction y and the first lateral surface 12c and between the other end of the first and second facing-electrode sections 18a, 18b in the width direction y and the second lateral surface 12d. The end portions 24b are provided between the end of the first inner-electrode layers 16a opposite the first extended-electrode section 20a and the second end surface 12f and between the end of the second inner-electrode layers 16b opposite the second extended-electrode section 20b and the first end surface 12e.

The inner-electrode layers 16 contain a suitable electrically conductive material. Examples include metals, such as, for example, Ni, Cu, Ag, Pd, and Au, and alloys containing at least one of these metals, such as Ag—Pd alloys. The electrically conductive paste used to form the inner-electrode layers 16 preferably contains ethyl cellulose or a polyvinyl butyral resin as a resin component.

Preferably, the thickness of the inner-electrode layers 16 is about 0.2 μm or more and about 2.0 μm or less, for example. It is preferred that about 10 to about 1400 inner-electrode layers 16 be used.

On the first and second end surfaces 12e, 12f of the multilayer body 12 are outer electrodes 26. The outer electrodes 26 include a first outer electrode 26a and a second outer electrode 26b.

The first outer electrode 26a is on the first end surface 12e of the multilayer body 12 and extends from the first end surface 12e to partially cover each of the first and second primary surfaces 12a, 12b and first and second lateral surfaces 12c, 12d. In this preferred embodiment, the first outer electrode 26a is electrically coupled to the first extended-electrode section 20a, of the first inner-electrode layers 16a. The first outer electrode 26a may instead be limited to the first end surface 12e of the multilayer body 12.

The second outer electrode 26b is on the second end surface 12f of the multilayer body 12 and extends from the second end surface 12f to partially cover each of the first and second primary surfaces 12a, 12b and first and second lateral surfaces 12c, 12d. In this preferred embodiment, the second outer electrode 26b is electrically coupled to the second extended-electrode section 20b, of the second inner-electrode layers 16b. The second outer electrode 26b may instead be limited to the second end surface 12f of the multilayer body 12.

Inside the multilayer body 12, the first and second facing-electrode sections 18a, 18b, of the first and second inner-electrode layers 16a, 16b, respectively, face each other with dielectric layers 14 therebetween, creating capacitances. Since the first and second inner-electrode layers 16a, 16b are coupled to the first and second outer electrodes 26a, 26b, respectively, this creates capacitances between the first and second outer electrodes 26a, 26b. As a result, the MLCC 10 develops its capacitor properties.

Figure 4A:
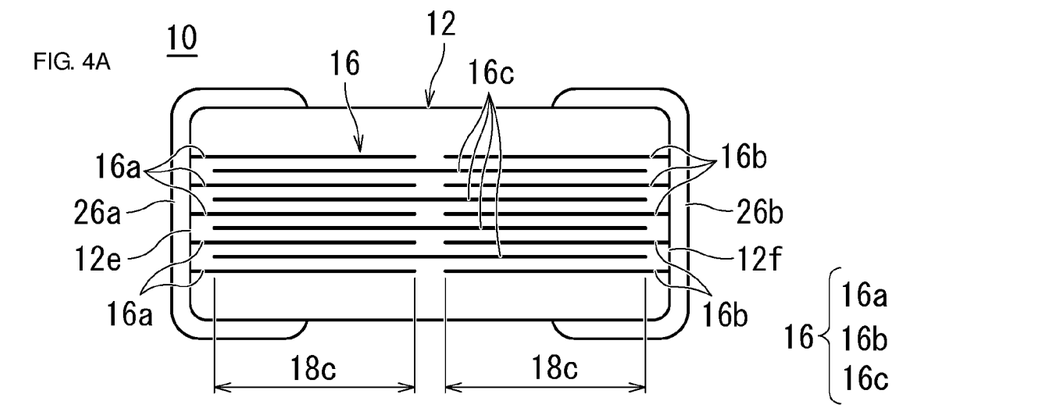
FIGS. 4A to 4C are cross-sections taken along line II-II in FIG. 1 and illustrate structures of an MLCC according to a preferred embodiment of the present invention in which the facing-electrode section of each inner-electrode layer is divided into two, three, and four, respectively.
Figure 4B:
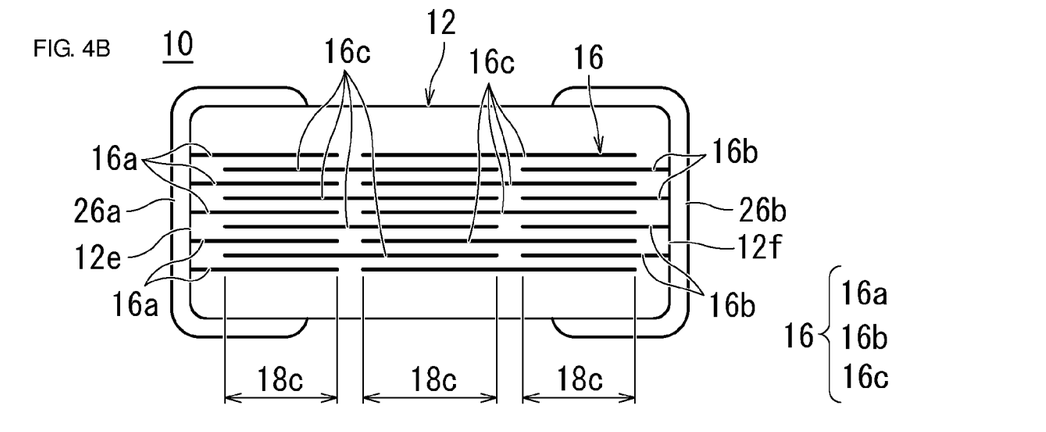
Figure 4C:
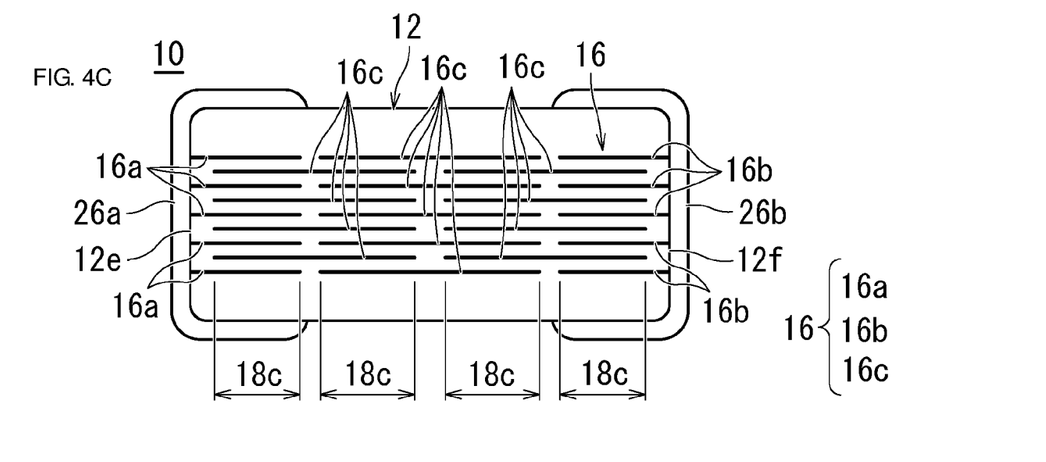

In possible structures, the inner electrodes 16 may include floating inner-electrode layers 16c besides the first and second inner-electrodes layers 16a, 16b as illustrated in FIGS. 4A to 4C. The floating inner-electrode layers 16c are not extended to the first or second end surface 12e, 12f and provide divided facing-electrode sections 18c. Examples include duplex, triplex, and quadruplex structures as in FIGS. 4A, 4B and 4C, respectively, and of course structures with more than four facing-electrode sections 18c per layer. In such a structure with divided facing-electrode sections 18c, multiple capacitor components provided between facing pairs of the inner-electrode layers 16a, 16b, 16c are connected in series. This reduces the voltage applied to the individual capacitor components, allowing the MLCC 10 to withstand a higher voltage.

The first outer electrode 26a preferably includes a first substrate electrode layer 28a and a first plating layer 30a on the surface of the first substrate electrode layer 28a. Likewise, the second outer electrode 26b includes a second substrate electrode layer 28b and a second plating layer 30b on the surface of the second substrate electrode layer 28b.

The first substrate electrode layer 28a is on the first end surface 12e of the multilayer body 12 and extends from the first end surface 12e to partially cover each of the first and second primary surfaces 12a, 12b and first and second lateral surfaces 12c, 12d.

The second substrate electrode layer 28b is on the second end surface 12f of the multilayer body 12 and extends from the second end surface 12f to partially cover each of the first and second primary surfaces 12a, 12b and first and second lateral surfaces 12c, 12d.

Alternatively, the first substrate electrode layer 28a may instead be limited to the first end surface 12e of the multilayer body 12, and the second substrate electrode layer 28b may instead be limited to the second end surface 12f of the multilayer body 12 if so desired.

The first and second substrate electrode layers 28a, 28b (hereinafter also referred to simply as the substrate electrode layers) each have at least one selected from, for example, a baked layer, an electrically conductive resin layer, and a thin-film layer.

To begin with, first and second substrate electrode layers 28a, 28b formed as baked layers can be described as follows.

The baked layers contain glass and metal, for example at least one selected from Cu, Ni, Ag, Pd, Ag—Pd alloys, Au, and so forth. The glass contains at least one selected from B, Si, Ba, Mg, Al, Li, and so forth. Instead of glass, the same dielectric material as in the dielectric layers 14 may be used. The baked layers may be multilayer. The baked layers are produced by applying an electrically conductive paste containing glass and metal to the multilayer body 12 and baking the applied paste. The applied paste may be fired simultaneously with the dielectric layers 14 and the inner-electrode layers 16 or baked after the firing of the dielectric layers 14 and the inner-electrode layers 16. If the applied paste is fired simultaneously with the inner-electrode layers 16, it is preferred to use the same dielectric material as in the dielectric layers 14 instead of glass.

The thickness of each baked layer is preferably about 10 µm or more and about 50 µm or less, for example, as measured in the middle in the vertical direction of the first and second substrate electrode layers 28a, 28b, located on the first and second end surfaces 12e, 12f, respectively.

Next, first and second substrate electrode layers 28a, 28b which are made from electrically conductive resin layers is described as follows.

The electrically conductive resin layers are placed on the surface of baked layers to cover the baked layers or may be directly on the surface of the multilayer body 12. Electrically conductive resin layers placed on baked layers may cover the baked layers completely or leave a portion (e.g., ends) of the baked layers exposed.

The electrically conductive resin layers contain a thermosetting resin and metal. The thermosetting resin renders the electrically conductive resin layers more flexible, for example, than electrically conductive layers produced by plating or firing an electrically conductive paste. With their flexibility, the electrically conductive resin layers buffer any physical or thermal cycling-related impact on the MLCC 10, thus preventing cracks in the MLCC 10.

The metal contained in the electrically conductive resin layers can be, for example, Ag, Cu, or an alloy of these metals. An Ag-coated metal powder can also be used. If an Ag-coated metal powder is used, it is preferred that the metal powder be a powder of Cu or Ni. The Cu powder may be pretreated to prevent oxidation. An electrically conductive powder of Ag is particularly preferred because Ag is suitable for use as an electrode material owing to its lowest resistivity among metals and is a noble metal, i.e., inert to oxidation and highly weatherable. Using an Ag-coated metal is also preferred because these advantages of Ag can be preserved with a less costly core metal.

The primary role of the metal (electrically conductive filler) in the electrically conductive resin layers is to provide electrical conductivity. Specifically, particles of the electrically conductive filler create paths for currents inside the electrically conductive resin layers by touching one another.

As for shape, the electrically conductive filler can be, for example, spherical or oblate.

The metal in the electrically conductive resin layers may be a powder of a single metal or a powder of multiple metals, for example a metal powder composed of first and second metal components. If the electrically conductive resin layers are formed after substrate electrode layers, a powder of a single metal is preferred, and if the electrically conductive resin layers are formed without substrate electrode layers, a metal powder composed of first and second metal components is preferred.

The first metal component has a lower melting point than the second. The melting point of the first metal component is preferably, for example, about 550° C. or less, more preferably about 180° C. or more and about 340° C. or less.

The melting point of the second metal component is preferably, for example, about 850° C. or more and about 1050° C. or less.

The first metal component is preferably, for example, Sn, In, Bi, or an alloy containing at least one of these metals, more preferably Sn or an alloy containing Sn. Specific examples of Sn-containing alloys include Sn—Ag, Sn—Bi, and Sn—Ag—Cu.

When heated, the first metal component softens and starts to flow at relatively low temperatures. The softened first metal component forms a compound with the metal in the inner-electrode layers 16.

The second metal component is preferably, for example, Cu, Ag, Pd, Pt, Au, or a similar metal or an alloy containing at least one of these metals. It is particularly preferred that the second metal component be Cu or Ag.

The primary role of the second metal component is to provide electrical conductivity. Specifically, particles of the second metal component or particles of the first and second metal components create paths for currents inside the first and second outer electrodes 26a, 26b by touching one another.

As for shape, the first and second metal components may have any shape.

The resin in the electrically conductive resin layers is preferably selected from a variety of known thermosetting resins, such as, for example, epoxy, phenolic, urethane, silicone, and polyimide resins. One of the most suitable resins is epoxy resin, which is superior in, for example, thermal and moisture resistance and adhesiveness.

Preferably, the electrically conductive resin layers contain a curing agent in combination with the thermosetting resin. If the base resin is epoxy resin, the curing agent for it can be selected from a variety of known compounds, such as phenolic resins, amines, acid anhydrides, and imidazoles.

The electrically conductive resin layers may be multilayer.

The thickness of each electrically conductive resin layer is preferably about 10 µm or more and about 150 µm or less, for example, as measured in the middle of the first and second substrate electrode layers 28a, 28b in the vertical direction, located on the first and second end surfaces 12e, 12f, respectively (thickest point of the resin layer).

Substrate electrode layers formed as thin-film layers are about 1-µm or thinner layers of deposited metal particles preferably formed by a thin-film formation technique, such as sputtering or vapor deposition, for example.

The first plating layer 30a preferably covers the first substrate electrode layer 28a. Specifically, the first plating layer 30a extends over the portion of the first substrate electrode layer 28a on the first end surface 12e, preferably reaching the portions of the first substrate electrode layer 28a on the first and second primary surfaces 12a, 12b and the first and second lateral surfaces 12c, 12d. The first plating layer 30a may instead be limited to the portion of the first substrate electrode layer 28a on the first end surface 12e.

The second plating layer 30b preferably covers the second substrate electrode layer 28b. Specifically, the second plating layer 30b extends over the portion of the second substrate electrode layer 28b on the second end surface 12f, preferably reaching the portions of the second substrate electrode layer 28b on the first and second primary surfaces 12a, 12b and the first and second lateral surfaces 12c, 12d. The second plating layer 30b may instead be limited to the portion of the second substrate electrode layer 28b on the second end surface 12f.

The first and second plating layers 30a, 30b (hereinafter also referred to simply as the plating layers) contain, for example, at least one selected from Cu, Ni, Sn, Ag, Pd, Ag—Pd alloys, Au, and so forth.

The plating layers may be multilayer, preferably having a two-layer structure consisting of Ni and Sn plating. Plating the surface of the substrate electrode layers with Ni will prevent solder from corroding the substrate electrode layers when the MLCC 10 is mounted onto a substrate. Plating the Ni plating with Sn will help mount the MLCC 10 onto a substrate by promoting the wetting of the substrate with the solder.

In such a multilayer plating layer, the thickness of each plating is preferably about 1 μm or more and about 15 μm or less, for example.

It is to be noted that the substrate electrode layers are optional; the plating layers may be the only component of the outer electrodes 26. The following describes a structure that has plating layers and no substrate electrode layers.

Each of the first and second outer electrodes 26a, 26b may be a plating layer formed directly, or without a substrate electrode layer interposed, on the surface of the multilayer body 12. In other words, the MLCC 10 may include plating layers each electrically coupled to the first or second inner-electrode layers 16a, 16b. Such plating layers may be formed after pretreatment of the surface of the multilayer body 12 with a catalyst.

Each plating layer preferably includes a lower plating electrode on the surface of the multilayer body 12 and an upper plating electrode on the surface of the lower plating electrode.

Preferably, the lower and upper plating electrodes each contain, for example, at least one metal selected from Cu, Ni, Sn, Pb, Au, Ag, Pd, Bi, Zn, and so forth or an alloy containing such a metal or metals.

The lower plating electrode is preferably made using Ni, which provides a barrier against solder, and the upper plating electrode is preferably made using Sn and/or Au, good in wettability. If the first and second inner-electrode layers 16a, 16b are made using Ni for example, it is preferred that the lower plating electrode be made using Cu, which bonds well with Ni. It should be understood that the upper plating electrode is optional; the lower plating electrode may be the only component of each of the first and second outer electrodes 26a, 26b.

The plating layers, moreover, may have the upper plating electrode as their uppermost layer or may instead have an extra plating electrode on the surface of the upper plating electrode.

In such a plating layer formed without a substrate electrode layer, the thickness of each plating electrode is preferably about 1 μm or more and about 15 μm or less, for example. The plating layers preferably contain no glass. The volumetric metal content of the plating layers is preferably about 99 vol % or more, for example.

Here, the dimensions in the length direction z, stacking direction x, and width direction y of the MLCC 10 including the multilayer body 12 and the first and second outer electrodes 26a, 26b are defined as L, T, and W dimensions, respectively.

Preferred dimensions of the MLCC 10 are: L dimension (length direction z), about 0.25 mm or more and about 3.45 mm or less; W dimension (width direction y), about 0.125 mm or more and about 2.65 mm or less; T dimension (stacking direction x), about 0.125 mm or more and about 2.65 mm or less, for example.

The MLCC 10 illustrated in FIG. 1 preferably has barium titanate-based dielectric layers 14, and protective layers 22 containing calcium zirconate cover inner-electrode layers 16 at the interfaces between the dielectric layers 14 and the inner-electrode layers 16. Barium titanate gives the MLCC 10 a high capacitance by virtue of its inherent nature, and the calcium zirconate-containing protective layers 22 covering the inner-electrode layers 16 provide layers of high electrical resistance between the dielectric layers 14 and the inner-electrode layers 16, increasing the overall resistance of the multilayer body 12. The magnitude of flowing current under a given voltage load is therefore smaller than would be without the protective layers 22. As a result, the MLCC 10 is practically free from thermal damage and the associated breakdown.

The following describes a non-limiting example method according to a preferred embodiment of the present invention for the production of an MLCC.

(1) Preparing Dielectric Sheets and an Electrically Conductive Paste for Inner Electrodes The method starts with preparing dielectric sheets and an electrically conductive paste to form inner electrodes. The binder and solvent used in these dielectric sheets and electrically conductive paste can be a known organic binder and a known organic solvent.

The dielectric sheets according to the present preferred embodiment of the present invention are preferably made primarily from a powder of barium titanate ($BaTiO_3$), specifically a $BaTiO_3$ powder obtained by weighing out and mixing predetermined amounts of $BaCO_3$ and $TiO_2$ powders for a predetermined period of time using a ball mill and heating the resulting mixture.

Then secondary ingredients, powders of $Dy_2O_3$, MgO, MnO, and $SiO_2$, are prepared and weighed out to about 0.75 mol parts (by the number of moles; the same applies hereinafter), about 1 mol part, about 0.2 mol parts, and about 1 mol part, respectively, per 100 mol parts of the primary ingredient, for example. These powders are mixed with the primary ingredient, barium titanate ($BaTiO_3$) powder, for a predetermined period of time using a ball mill, and the resulting mixture is dried and dry-milled to give feedstock powder.

The feedstock powder is preferably wet-mixed with a polyvinyl butyral binder and an organic solvent, for example ethanol, using a ball mill to give slurry. The resulting ceramic slurry is shaped into sheets by doctor blading. In this way, dielectric sheets are obtained.

An electrically conductive paste to form inner electrodes is then prepared. An electrically conductive metal powder is wet-mixed with a binder, for example a polyvinyl butyral binder, and an organic solvent, for example ethanol, using a ball mill to give paste.

To the resulting electrically conductive paste to form inner electrodes is added a powder of calcium zirconate ($CaZrO_3$). Adding a $CaZrO_3$ powder to the electrically conductive paste to form inner electrodes at this stage of production will allow for protective layers 22 to cover inner-electrode layers 16 in a later step.

The amount of $CaZrO_3$ powder (common material: common material is defined as a ceramic material that is shared both dielectric sheets and inner electrodes, in other words, the inner electrodes may include the same or similar ceramic material (common material or common ceramic material) as a ceramic material used for the dielectric sheets) is preferably about 10.2 vol % or more and about 25 vol % or less as expressed as volume of calcium zirconate/(volume of calcium zirconate+volume of Ni)×100, for example. Adding such an amount of $CaZrO_3$ powder will allow the protective layers 22 to be formed to their desired thickness.

(2) Forming an Inner-Electrode Pattern on Dielectric Sheets

Then the electrically conductive paste to form inner electrodes is applied to the surface of some of the dielectric sheets to draw a predetermined pattern. This produces an inner-electrode pattern on the dielectric sheets. Known printing techniques such as screen printing and gravure printing can be used.

(3) Obtaining a Multilayer Sheet

Then a predetermined number of dielectric sheets used in defining outer layers (i.e., dielectric sheets not printed with the inner-electrode pattern) are stacked. On the resulting stack, the dielectric sheets printed with the inner-electrode pattern are stacked in order. On the resulting stack, a predetermined number of dielectric sheets for outer layers are stacked, completing a multilayer sheet. The dielectric sheets printed with the inner-electrode pattern are stacked in such a manner that the extended-electrode section of the pattern faces opposite directions from one sheet to the next.

(4) Obtaining a Multilayer Block

The resulting multilayer sheet is pressed in the stacking direction, for example by isostatic pressing, into a multilayer block.

(5) Obtaining Multilayer Chips

Thereafter the multilayer block, obtained by pressing such as isostatic pressing, is cut to a predetermined shape and dimensions with a cutting or dicing machine and thus divided into separate multilayer chips of a predetermined size. The corners and edges of the multilayer chips may be rounded, for example by barrel finishing, to reduce the chipping of fired work pieces.

(6) Obtaining Multilayer Bodies

Then the green multilayer chips are fired to give multilayer bodies 12. The firing conditions are as follows.

That is, the multilayer chips are preferably fired at a firing temperature of about 1200° C. or more and about 1400° C. or less; in a firing atmosphere containing about 1000 ppm or more and about 5000 ppm or less of oxygen concentration; with the rate of temperature rise from about 800° C. to the highest temperature being at least about 100° C./sec; and for a firing duration of about 4 seconds or more and about 8 seconds or less, for example. Under such firing conditions, the $CaZrO_3$ powder in the electrically conductive paste to form inner electrodes, added to the paste during its preparation, is expelled from the inner electrodes and forms $CaZrO_3$-containing protective layers 22 at the interfaces between the dielectric layers 14 and the inner-electrode layers 16 without $CaZrO_3$ diffusing into the dielectric layers 14.

If necessary, the corners and edges of the multilayer bodies 12 may be rounded by barrel finishing.

(7) Forming Outer Electrodes

Then baked layers to form outer electrodes 26 are formed. In an exemplary process for this, the exposed portion, on the first end surface 12e of the multilayer bodies 12, of the first extended-electrode section 20a as part of the first inner-electrode layers 16a is coated, for example by dipping, with an electrically conductive paste to form outer electrodes, a paste containing a glass component and metal, and the applied coating is baked to give a first substrate electrode layer 28a. Likewise, the exposed portion, on the second end surface 12f of the multilayer bodies 12, of the second extended-electrode section 20b as part of the second inner-electrode layers 16b is coated, for example by dipping, with the electrically conductive paste to form outer electrodes, and the applied coating is baked to give a second substrate electrode layer 28b. The baking temperature is preferably, for example, about 800° C.

If the substrate electrode layers are formed as electrically conductive resin layers, the electrically conductive resin layers can preferably be formed as follows. It is to be noted that the electrically conductive resin layers may be formed on the surface of baked layers or may be formed directly, without baked layers, on the surface of the multilayer bodies 12.

The electrically conductive resin layers are formed by applying an electrically conductive paste containing a thermosetting resin and metal component(s) to the baked layers or the surface of the multilayer bodies 12 and heating the applied coatings at a temperature of about 250° C. or more and about 550° C. or less, preferably in a $N_2$ atmosphere, for example, to thermally cure the resin. Preferably, the oxygen concentration is limited to about 100 ppm or less to prevent the scattering of the resin and the oxidation of the metal component(s).

Substrate electrode layers formed as thin-film layers can preferably be formed by a thin-film formation technique, such as sputtering or vapor deposition. The resulting thin-film substrate electrode layers are about 1-µm or thinner layers of deposited metal particles, for example.

Alternatively, the substrate electrode layers may be omitted, and plating layers may instead be formed on the portions of the inner-electrode layers 16 exposed on the multilayer bodies 12. Such plating layers are preferably formed as follows.

The first and second end surfaces 12e, 12f of the multilayer bodies 12 are plated to form a lower plating electrode on the exposed portions of the inner-electrode layers 16. Both electroplating and electroless plating can be used, but usually electroplating is preferred because electroless plating disadvantageously involves a complicated process due to the necessity of a pretreatment, for example with a catalyst, for faster deposition of the plating metal. Barrel plating is preferred to other plating methods. If necessary, an upper plating electrode may be formed on the surface of the lower plating electrode in the same way.

Then a plating layer is formed on the surface of the substrate electrode layers, electrically conductive resin layers, lower plating electrodes, or upper plating electrodes to complete outer electrodes 26. In the MLCC 10 illustrated in FIG. 1, each outer electrode 26 includes a baked layer and a plating layer thereon including Ni and Sn plating. The Ni and Sn plating are formed in order, for example by barrel plating.

In this way, MLCCs 10 as illustrated in FIG. 1 are produced.

In the method according to the present preferred embodiment of the present invention for producing an MLCC, the firing of green multilayer chips to obtain multilayer bodies is performed at a firing temperature of about 1200° C. or more and about 1400° C. or less; in a firing atmosphere containing about 1000 ppm or more and about 5000 ppm or less of oxygen; with the rate of temperature rise from about 800° C. to the highest temperature being at least about 100° C./sec; and for a firing duration of about 4 seconds or more and about 8 seconds or less, for example. Under such firing conditions, the $CaZrO_3$ powder in the electrically conductive paste to form inner electrodes, added to the paste during its preparation, is expelled from the inner electrodes and forms $CaZrO_3$-containing protective layers 22 at the interfaces between the dielectric layers 14 and the inner-electrode layers 16 without $CaZrO_3$ diffusing into the dielectric layers 14. The method according to this preferred embodiment of the present invention for producing an MLCC therefore gives the resulting MLCCs 10 a high capacitance by virtue of the inherent nature of barium titanate and leaves layers of high electrical resistance between the dielectric layers 14 and inner-electrode layers 16 by forming $CaZrO_3$-containing protective layers 22 to cover the inner-electrode layers 16. The increased overall resistance of the multilayer body 12 owing to the protective layers 22 translates into a smaller magnitude of flowing current under a given voltage load. The amount of heat generated by flowing currents is therefore smaller than would be without the protective layers 22.

The resulting MLCCs 10 are therefore practically free from thermal damage and the associated breakdown.

In a method according to a preferred embodiment of the present invention for producing an MLCC, moreover, the thickness, for example of the protective layers 22 formed to cover the inner-electrode layers 16, can be controlled by adjusting the amount of $CaZrO_3$ powder (common material added during the preparation of the electrically conductive paste to form inner electrodes) as expressed as volume of calcium zirconate/(volume of calcium zirconate+volume of Ni)×100 within the range of about 10.2 vol % to about 25 vol %, for example.

3. Experiment 1

In Experiment 1, the advantages of the above-described MLCC according to a preferred embodiment of the present invention were verified by fabricating MLCCs in accordance with a production method according to another preferred embodiment and subjecting the MLCCs to capacitance and high-temperature loading tests. The substrate electrode layers were baked layers.

(1) Sample Preparation Conditions in Experiment 1

Sample MLCCs of Experiment 1 were fabricated using the above-described production method under the conditions specified below.

In Example 1-1 in Experiment 1, the specifications of the sample MLCCs were as follows (values may be approximate).

MLCC size (design values): Length×Width×Height=1.17 mm×0.68 mm×0.68 mm
Capacitance: 9.8 µF
Voltage rating: 6.3 V
Material for dielectric layers: $BaTiO_3$
Thickness of dielectric layers: 1 µm
Material for inner-electrode layers: Ni
Amount of $CaZrO_3$ powder in the electrically conductive paste to form inner electrodes: 10.2 vol % as calcium zirconate/(calcium zirconate+Ni)
Thickness of protective layers: 0.008 µm
Percentage area covered of inner electrodes with protective layers at the interfaces between dielectric and inner-electrode layers: 100%
Outer electrode structure
Construction of substrate electrode layers: Electrodes containing an electrically conductive metal (Cu) and a glass component
Thickness as measured in the middle in the vertical direction, located on the first and second end surfaces, in a ½ W cross-section of the multilayer body: 30 µm
Thickness as measured in the middle in the length direction, located on the first and second primary surfaces and the first and second lateral surfaces, in a ½ W cross-section of the multilayer body: 5 µm
Plating layers: Two-layer structure consisting of Ni and Sn plating
Ni plating
Thickness as measured in the middle in the vertical direction, located on the first and second end surfaces, in a ½ W cross-section of the multilayer body: 4 µm
Thickness as measured in the middle in the length direction, located on the first and second primary surfaces and the first and second lateral surfaces, in a ½ W cross-section of the multilayer body: 4 µm
Sn plating
Thickness as measured in the middle in the vertical direction, located on the first and second end surfaces, in a ½ W cross-section of the multilayer body: 4 µm
Thickness as measured in the middle in the length direction, located on the first and second primary surfaces and the first and second lateral surfaces, in a ½ W cross-section of the multilayer body: 4 µm In Example 1-1 in Experiment 1, the firing conditions for multilayer bodies were as follows (values may be approximate):
Firing temperature: 1400° C.
Firing atmosphere: 3000 ppm of oxygen
Rate of temperature rise: 100° C./sec from 800° C. to the highest temperature
Duration of firing at the highest temperature: 6 seconds In Comparative Example 1-1, the MLCC's design capacitance was 10.5 µF. The sample MLCCs were fabricated without a $CaZrO_3$ powder in the electrically conductive paste to form inner electrodes and therefore had no protective layers. The other specifications were the same as those of the MLCCs of Example 1-1.

The firing conditions for multilayer bodies were also the same as in Example 1-1.

In Comparative Example 1-2, the dielectric layers of the MLCCs were made of $CaZrO_3$, and the MLCCs' design capacitance and voltage rating were about 0.01 µF and about 25 V, respectively. The MLCCs were fabricated without a $CaZrO_3$ powder in the electrically conductive paste to form inner electrodes and therefore had no protective layers. The other specifications were the same as those of the MLCCs of Example 1-1.

The firing conditions for multilayer bodies were similar to Example 1-1, but the firing duration was controlled with the upper limit being about 6 seconds.

In Comparative Example 1-3, the MLCC's design capacitance was 10.1 µF, and the amount of $CaZrO_3$ powder in the electrically conductive paste to form inner electrodes was about vol % as calcium zirconate/(calcium zirconate+Ni). The protective layers were about 0.002 µm thick and covered about 65% area of the inner electrodes at the interfaces between the dielectric and inner-electrode layers. The other specifications were the same as those of the MLCCs of Example 1-1.

The firing conditions for multilayer bodies were similar to Example 1-1, but the firing duration was controlled with the upper limit being about 6 seconds.

(2) Measurements (a) Thickness of Protective Layers

A sample MLCC was ground to expose a cross-section, for example an LT cross-section at about ½ W, and the exposed cross-section was observed by scanning electron microscopy (SEM). The same point as observed by SEM was analyzed by wavelength-dispersive X-ray spectroscopy (WDX) to find differences in chemical make-up. The SEM and WDX images were laid over one another, and the distribution of the protective layers was identified on basis of the differences in chemical make-up. From the identified distribution, the thickness of the protective layers was determined.

(b) Percentage Area Covered of Inner-Electrode Layers with Protective Layers

A sample MLCC was ground to expose a cross-section, for example, an LT cross-section at about ½ W, the exposed cross-section was analyzed by WDX for differences in chemical make-up, and the distribution of the protective layers was identified on the basis of the differences in chemical make-up. From the identified distribution, the percentage area covered was calculated.

(c) Capacitance

An MLCC's capacitance was measured using a capacitance tester (LCR meter) under measuring conditions according to the relevant industrial standard (JIS C 5101-1: 1998).

(d) High-Temperature Loading Test

One hundred sample MLCCs were monitored for changes in insulation resistance under a DC voltage of about 100 V at about 150° C. Specifically, each MLCC was assessed to have failed at the time when its insulation resistance fell below about 10 kΩ. Table 1 presents measurement results for Example 1-1 and Comparative Examples 1-1 to 1-3.

TABLE 1

|  |  | Example 1-1 | Comparative Example 1-1 | Comparative Example 1-2 | Comparative Example 1-3 |
|---|---|---|---|---|---|
| Calcium zirconate powder | (vol %) | 10.2 | — | — | 8.0 |
| Protective layer thickness | (μm) | 0.008 | 0 | 0 | 0.002 |
| Area covered with protective layers | (%) | 100 | 0 | 0 | 65 |
| Capacitance | (μF) | 10.48 | 10.60 | 0.01 | 10.10 |
| No. of rejects in high-temperature loading test |  | 0/100 | 5/100 | 0/100 | 3/100 |

(3) Experimental Results

In Example 1-1, the results were good in all measurements. As shown in Table 1, the capacitance was about 10.48 μF compared with the design value of 9.8 μF, and there was no reject in the high-temperature loading test. This is because the dielectric layers were made primarily from barium titanate, and that the MLCCs had calcium zirconate-containing protective layers covering their inner-electrode layers at the interfaces between the dielectric and inner-electrode layers.

In Comparative Example 1-1, the capacitance was good, about 10.60 μF compared with the design value of 10.5 μF, by virtue of the dielectric layers made primarily from barium titanate. In the high-temperature loading test, however, there were five rejects out of the 100 tested. This is because no protective layers were formed at the interfaces between the dielectric and inner-electrode layers.

In Comparative Example 1-2, there was no reject in the high-temperature loading test by virtue of the dielectric layers made primarily from calcium zirconate. The capacitance, however, was about 0.01 μF, low compared with the examples with barium titanate dielectric layers, such as Example 1-1.

In Comparative Example 1-3, the capacitance was good, about 10.10 μF compared with the design value of 10.1 μF, by virtue of the dielectric layers made primarily from barium titanate. In the high-temperature loading test, however, there were three rejects out of the 100 tested. This is because the MLCCs had calcium zirconate-containing protective layers covering their inner-electrode layers at the interfaces between the dielectric and inner-electrode layers but with only about 65% area covered.

Overall, MLCCs according to a preferred embodiment of the present invention have barium titanate-based dielectric layers and also have $CaZrO_3$-containing protective layers covering inner-electrode layers at the interfaces between the dielectric and inner-electrode layers. Barium titanate gives the MLCCs a high capacitance by virtue of its inherent nature, and the $CaZrO_3$-containing protective layers covering the inner-electrode layers provide layers of high electrical resistance between the dielectric and inner-electrode layers, increasing the overall resistance of the multilayer body of the MLCCs.

The magnitude of flowing current under a given voltage load is therefore smaller than would be without the protective layers. As a result, the MLCCs are practically free from thermal damage and therefore the associated breakdown.

It was therefore suggested that MLCCs according to a preferred embodiment of the present invention combines a high capacitance and high reliability in operation at high temperatures.

4. Experiment 2

In Experiment 2, the advantages of the above-described MLCC according to a preferred embodiment of the present invention were verified by fabricating MLCCs varying in the thickness of protective layers in accordance with a method according to another preferred embodiment and subjecting the MLCCs to capacitance and high-temperature loading tests. The substrate electrode layers were baked layers again.

(1) Sample Preparation Conditions in Experiment 2

Sample MLCCs of Experiment 2 were fabricated using the above-described production method under the conditions specified below. In Experiment 2, eight types of samples were prepared varying in the thickness of protective layers.

In Examples 2-1 to 2-8 in Experiment 2, the specifications of the sample MLCCs were as follows (values may be approximate).

MLCC size (design values): Length×Width×Height=1.17 mm×0.68 mm×0.68 mm

Capacitance: 9.8 μF

Voltage rating: 6.3 V

Material for dielectric layers: $BaTiO_3$

Thickness of dielectric layers: 1 μm

Material for inner-electrode layers: Ni

Amount of $CaZrO_3$ powder in the electrically conductive paste to form inner electrodes (calcium zirconate/(calcium zirconate+Ni)): See Table 2.

Thickness of protective layers: See Table 2.

Percentage area covered of inner electrodes with protective layers at the interfaces between dielectric and inner-electrode layers: 100%

Outer electrode structure

Construction of substrate electrode layers: Electrodes containing an electrically conductive metal (Cu) and a glass component Thickness as measured in the middle in the vertical direction, located on the first and second end surfaces, in a ½ W cross-section of the multilayer body: 30 μm Thickness as measured in the middle in the length direction, located on the first and second primary surfaces and the first and second lateral surfaces, in a ½ W cross-section of the multilayer body: 5 μm Plating layers: Two-layer structure consisting of Ni and Sn plating Ni plating Thickness as measured in the middle in the vertical direction, located on the first and second end surfaces, in a ½ W cross-section of the multilayer body: 4 μm Thickness as measured in the middle in the length direction, located on the first and second primary surfaces and the first and second lateral surfaces, in a ½ W cross-section of the multilayer body: 4 μm Sn plating Thickness as measured in the middle in the vertical direction, located on the first and second end surfaces, in a ½ W cross-section of the multilayer body: 4 μm Thickness as measured in the middle in the length direction, located on the first and second primary surfaces and the first and second lateral surfaces, in a ½ W cross-section of the multilayer body: 4 μm The firing conditions for multilayer bodies were the same as in Experiment 1.

The thickness of protective layers in the sample MLCCs used in Experiment 2 was as follows:

Example 2-1, about 0.003 μm;
Example 2-2, about 0.008 μm;
Example 2-3, about 0.015 μm;
Example 2-4, about 0.030 μm;
Example 2-5, about 0.045 μm;
Example 2-6, about 0.060 μm;
Example 2-7, about 0.075 μm; and
Example 2-8, about 0.085 μm.

(2) Measurements (a) Thickness of Protective Layers

A sample MLCC was ground to expose a cross-section, for example, an LT cross-section at about ½ W, and the exposed cross-section was observed by SEM. The same point as observed by SEM was analyzed by WDX to find differences in chemical make-up. The SEM and WDX images were laid over one another, and the distribution of the protective layers was identified on basis of the differences in chemical make-up. From the identified distribution, the thickness of the protective layers was determined.

The other measurements, (b) Percentage area covered of inner-electrode layers with protective layers, (c) Capacitance, and (d) High-temperature loading test, were performed in the same way as in Experiment 1.

Table 2 presents measurement results for Examples 2-1 to 2-8.

In Example 2-1, in which the protective layers were thinner than about 1.5% of the dielectric layers, the high-temperature load test rejected one device out of the 100 tested because unevenness of the protective layers affected the reliability of the MLCCs. In Example 2-8, in which the protective layers were thicker than about 15% of the dielectric layers, the capacitance was low, about 9.50 μF compared with the design value of 9.8 μF, because of the low dielectric constant of the protective layers.

Overall, protective layers whose thickness is about 1.5% or more and about 15% or less of that of the dielectric layers ensure good results in a high-temperature loading test.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including:
      a stack of a plurality of dielectric layers;
      first and second primary surfaces opposite to each other in a stacking direction;
      first and second lateral surfaces opposite to each other in a width direction perpendicular to the stacking direction; and
      first and second end surfaces opposite to each other in a length direction perpendicular to both the stacking direction and the width direction;
   a plurality of inner-electrode layers alternating with the dielectric layers and exposed at the end surfaces; and
   outer electrodes disposed on the end surfaces and connected to the inner-electrode layers; wherein
   the dielectric layers include barium titanate as a primary component; and
   protective layers containing calcium zirconate covering the inner-electrode layers are located at interfaces between the dielectric layers and the inner-electrode layers.

TABLE 2

| | Example 2-1 | Example 2-2 | Example 2-3 | Example 2-4 | Example 2-5 | Example 2-6 | Example 2-7 | Example 2-8 |
|---|---|---|---|---|---|---|---|---|
| Calcium zirconate powder (vol %) | 9.1 | 10.2 | 11.8 | 15.0 | 18.3 | 21.5 | 24.7 | 26.8 |
| Relative protective layer thickness to dielectric layer thickness (%) | 0.5 | 1.5 | 3.0 | 6.0 | 9.0 | 12.0 | 15.0 | 17.0 |
| Area covered with protective layers (%) | 100 | 100 | 100 | 100 | 100 | 100 | 100 | 100 |
| Absolute protective layer thickness (μm) | 0.003 | 0.008 | 0.015 | 0.030 | 0.045 | 0.060 | 0.075 | 0.085 |
| Capacitance (μF) | 10.50 | 10.48 | 10.44 | 10.36 | 10.28 | 10.20 | 9.78 | 9.50 |
| No. of rejects in high-temperature loading test | 1/100 | 0/100 | 0/100 | 0/100 | 0/100 | 0/100 | 0/100 | 0/100 |

(3) Experimental Results

Table 2 shows that in Examples 2-2 to 2-7, the sample MLCCs had good capacitances, about 9.78 μF to about 10.48 μF compared with the design value of 9.8 μF, and all passed the high-temperature loading test. This is because the percentage thickness of the protective layers relative to the thickness of the dielectric layers was about 1.5% or more and about 15% or less.

2. The multilayer ceramic capacitor according to claim 1, wherein the protective layers have a thickness of about 1.5% or more and about 15% or less with respect to a thickness of the dielectric layers.

3. The multilayer ceramic capacitor according to claim 1, wherein
   the multilayer body includes two outer-layer sections each defined by multiple ones of the plurality of dielectric layers, and an inner-layer section defined by one or more of the plurality of dielectric layers and multiple ones of the plurality of inner-electrode layers; and the two outer-layer sections have thicknesses of about 20 µm or more and about 200 µm or less.

4. The multilayer ceramic capacitor according to claim 1, wherein the plurality of dielectric layers include at least one of Mn, Fe, Cr, Co, and Ni.

5. The multilayer ceramic capacitor according to claim 1, wherein a thickness of each of the plurality of dielectric layers is about 0.70 µm or more and about 1.50 µm or less.

6. The multilayer ceramic capacitor according to claim 1, wherein the plurality of inner-electrode layers are made of at least one of Ni, Cu, Ag, Pd, Au, and alloys containing Ni, Cu, Ag, Pd, and Au.

7. The multilayer ceramic capacitor according to claim 1, wherein a thickness of each of the plurality of inner-electrode layers is about 0.2 µm or more and about 2.0 µm or less.

8. The multilayer ceramic capacitor according to claim 1, wherein the plurality of inner-electrode layers define first and second inner-electrodes layers which are respectively connected to different ones of the outer electrodes.

9. The multilayer ceramic capacitor according to claim 8, wherein the plurality of inner-electrode layers include floating inner-electrode layers which are provided between the first and second inner-electrodes layers; and the floating inner-electrode layers are not connected to the outer electrodes.

10. The multilayer ceramic capacitor according to claim 9, wherein the first and second inner-electrodes layers and the floating inner-electrode layers define multiple divided facing-electrode sections generating individual capacitances.

11. The multilayer ceramic capacitor according to claim 1, wherein the outer electrodes include a substrate electrode layer and a plating layer.

12. The multilayer ceramic capacitor according to claim 11, wherein the substrate electrode layer contacts and partially covers each of the first and second primary surfaces and the first and second lateral surfaces.

13. The multilayer ceramic capacitor according to claim 12, wherein the substrate electrode layer includes a baked layer that includes: (i) a metal including at least one of Cu, Ni, Ag, Pd, Ag—Pd alloys, Au, and (ii) a glass including at least one of B, Si, Ba, Mg, Al, Li.

14. The multilayer ceramic capacitor according to claim 12, wherein the substrate electrode layer has a thickness of about 10 µm or more and about 50 µm.

15. The multilayer ceramic capacitor according to claim 12, wherein the substrate electrode layer includes an electrically conductive resin layer.

16. The multilayer ceramic capacitor according to claim 15, wherein the electrically conductive resin layer includes a thermosetting resin and metal.

17. The multilayer ceramic capacitor according to claim 15, wherein a thickness of the electrically conductive resin layer is about 10 µm or more and about 150 µm or less.

18. The multilayer ceramic capacitor according to claim 11, wherein the plating layer includes a lower plating electrode on the multilayer body and an upper plating electrode on a surface of the lower plating electrode.

* * * * *